United States Patent [19]
Yoder

[11] Patent Number: 5,904,393
[45] Date of Patent: May 18, 1999

[54] RAIL MOUNTING SYSTEM

[75] Inventor: Ronald L. Yoder, Topeka, Ind.

[73] Assignee: Indiana Custom Trucks, Inc., LaGrange, Ind.

[21] Appl. No.: 08/796,073

[22] Filed: Feb. 5, 1997

[51] Int. Cl.⁶ ....................................................... B60P 7/02
[52] U.S. Cl. ................................. 296/100.17; 296/100.07
[58] Field of Search .................................. 296/32, 34, 36, 296/100.04, 100.06, 100.07, 100.1, 100.16, 100.17, 100.18

[56] References Cited

U.S. PATENT DOCUMENTS 5,487,585  1/1996  Wheatley ............................ 296/100.18

Primary Examiner—Andrew C. Pike
Attorney, Agent, or Firm—Woodard, Emhardt, Naughton, Moriarty & McNett

[57] ABSTRACT

A rail mounting system for mounting accessory items to truck bed sidewall includes a rail having a horizontal portion and a vertical portion adapted to respectively engage horizontal and vertical sidewalls of a truck bed. The rail further includes an angled extension extending nonorthogonally from the vertical portion and defining at least one opening therethrough. The rail further includes a bearing surface extending from the angled extension at a substantially orthogonal angle. A clamp is provided to hold the rail in position and includes on one end a clamping surface and on the other end a bearing surface engageable with the rail bearing surface. A fastener passes through the opening in the rail and attaches to the clamp. Upon tightening the fastener, the clamp slides along the rail bearing surface towards the angled extension. The nonorthogonal angle of the angled extension allows the clamp to exert either a vertical force, a horizontal force, or both on the truck bed sidewall. The direction of the clamping force depends on the orientation or configuration of the clamping surface.

20 Claims, 6 Drawing Sheets

RAIL MOUNTING SYSTEM

BACKGROUND OF THE INVENTION

1. Field of the Invention

This invention relates generally to mounting systems. In particular, it relates to mounting systems for attaching accessory items to a truck bed.

2. Description of the Prior Art

Devices for mounting and retaining truck bed accessories are well known in the art. The type of device utilized to secure an accessory item to a truck varies depending on the size and construction of the item to be mounted. Although clearly not exhaustive, examples of mountable truck bed accessories include tonneau covers, truck caps, truck bed campers, vinyl covers, and various decorative rails and lights.

One type of mounting device is simply a screw or threaded bolt and nut combination extending through the item to be mounted and into or through the truck bed sidewall. Use of such a mounting system requires that the truck bed have either preformed mounting holes or that holes be punched or drilled in the truck bed prior to mounting of the accessory. A problem with having preformed mounting holes is that there are a wide variety of truck bed accessory items, thereby making it impractical to preform mounting holes in the truck bed in an attempt to make every accessory item mountable without additional modification. Therefore, preformed mounting holes are rare for most truck bed accessories.

An alternative approach is to drill or punch a series of mounting holes in a portion of the truck bed sidewall suitable for mounting an accessory. The drilling or punching operation damages the truck bed finish and modifies the original condition of the truck. The damage to the truck bed finish creates an area where the truck bed may corrode over time. Moreover, if the accessory item is later removed, body work and painting will be required to return the truck to its original condition.

In an effort to overcome the drawbacks of fasteners which penetrate the sidewall of the truck bed, numerous clamping systems have been utilized. Many of these systems rely on a mounting rail or some other rigid member to rest upon the upper, horizontal surface of the sidewall. Typically, a non-abrasive material, commonly cab tape, is placed between the mounting rail and the truck bed to prevent damage to the truck bed finish. The accessory item is then securely attached to the mounting rail.

In one such device, a clamping member consisting of an upper and a lower clamping bracket interconnected by a threaded fastener can be used to clamp the mounting rail to the truck bed sidewall. The clamp in many respects resembles a vise with both ends of the clamp being driven towards one another by the threaded shaft. The upper clamping bracket extends over the top of the mounting rail and the lower clamping bracket extends under the horizontal portion of the sidewall. The threaded shaft connects the two clamp brackets and is operated to urge the clamping members together. The upper clamping bracket exerts a downward force on the rail, while the lower clamping bracket exerts a corresponding upward force on the underside of the truck bed sidewall. One drawback of this system is that the upper clamping member must extend above the uppermost surface of the mounting rail, thereby interfering with placement of items on the mounting rail and movement of cargo into and out of the truck bed. Another drawback is that the system clamps only a substantially horizontal portion of the sidewall; thus the mounting rail is not clamped to a vertical portion of the sidewall and may permit some degree of movement in the horizontal plane.

Several alternative rail and clamp combinations have been disclosed in an attempt to overcome the problems of the early vise-type clamp design. In some of these designs the mounting rail includes a vertical portion extending into the interior of the truck bed. The vertical portion includes a slot to receive a portion of the clamping system, thereby permitting the upper clamp to be located below the horizontal surface of the rail. Thus, items can be mounted flush with the upper surface of the rail. In many of these designs the rail is provided with a clamp mounting groove preformed into the rail for receiving an upper portion of either a clamp bracket or a threaded tightening member. Several designs have disclosed a "T" slot formed the entire length of the rail of the vertical surface facing towards the interior of the truck bed. A bolt or clamp member with a corresponding "T" end is inserted into the "T" slot and slid along the "T" slot until the desired clamping location is reached. In one device a clamping bracket is substantially a "C"-shaped clamping bracket. One end of the clamping bracket has a projection corresponding to the "T" slot while the other end has a threaded opening for receiving a threaded member. The threaded member is threaded through the opening and tightened until it exerts an upward force on the underside of the horizontal sidewall disposed beneath the rail. In this manner, the mounting rail is clamped to the truck bed.

In another similar arrangement, the head of a bolt is held in a slot defined on the vertical portion of the rail and extends in a vertical direction toward the floor of the truck bed. A clamp is positioned over the threaded end of the bolt and a nut is tightened until the clamp exerts an upward force on the underside of the horizontal sidewall disposed beneath the rail. Still a further design has a first clamp bracket which slides along the "T" slot and extends at an angle into the interior of the truck bed. The first clamp bracket has an opening for receiving a threaded member. A second clamp bracket slidingly engages the first clamp bracket and extends under the vertical portion of the truck bed sidewall to engage the horizontal portion of the sidewall disposed beneath the rail. Upon tightening the threaded member the second clamp portion clamps the rail to the horizontal sidewall.

It should be appreciated that since the "T" slot is formed on the vertical surface of the mounting rail extending into the interior of the truck bed, insertion of the clamp or bolt member into the slot results in the clamping member extending even further into the truck bed. Thus, many of these designs decrease the usable cargo space in the truck bed and may interfere with loading and unloading. Moreover, in many applications, forming a "T" slot along the entire length of the mounting rail increases the amount of material required to manufacture the rail and thereby increases the cost.

While the latter systems have created a clamping system which uses the rail itself as the upper clamping bracket, thereby permitting flush attachment of accessory items to the upper surface of the rail, these systems still unnecessarily extend into the cargo area of the truck bed. Moreover, although some of the mounting rails have a vertical portion to engage a vertical sidewall of the truck, the systems do not include a clamping member to securely clamp the vertical portion of the mounting rail to the truck bed.

Therefore, there remains a need for a rail mounting system that is capable of clamping both the vertical and horizontal segments of the truck sidewall. Further, the mounting system should have a low profile both with respect to the horizontal and the vertical surfaces of the rail. Finally, the system should be designed to permit easy and secure installation to a wide variety of truck bed styles with a minimum of components.

SUMMARY OF THE INVENTION

One form of the present invention contemplates a mounting system for use in attaching accessory items to a truck bed, comprising a substantially rigid member having a horizontal portion adapted to engage a horizontal surface of the truck bed and a vertical portion adapted to engage a vertical surface of the truck bed, the substantially rigid member further having an angled extension connected to the vertical portion and extending therefrom at a nonorthogonal angle, and a device for clamping the substantially rigid member to a portion of the truck bed, the device for clamping attached to the angled extension, the device for clamping imparting both a vertical clamping force and a horizontal clamping force against the truck bed.

Another form of the invention contemplates a truck bed mounting system, comprising a substantially rigid member having a horizontal portion adapted to engage a horizontal surface of a truck bed and a vertical portion adapted to engage a vertical surface of the truck bed, the substantially rigid member further having an angled extension connected to the vertical portion and extending therefrom at a nonorthogonal angle, the angled extension defining an opening, a fastening member extending through the opening in the angled extension, and a clamping bracket attached to the fastening member, the fastening member securing the clamping bracket to the substantially rigid member, whereby the clamping bracket clamps against the truck bed.

Still another form of the present invention contemplates a mounting rail for use in truck bed mounting systems, comprising a substantially horizontal portion adapted to engage a substantially horizontal portion of a truck bed, a substantially vertical portion adapted to engage a substantially vertical portion of the truck bed, the vertical portion having a first edge connected to the horizontal portion and a second edge opposite the first edge, and an angled extension connected to the second edge of the substantially vertical portion and extending therefrom at a nonorthogonal angle.

An object of the present invention is to provide a low profile mounting system.

Another object of the present invention is to provide a rail design that enables attachment of both vertical and horizontal clamps.

A further object of the present invention is to provide a mounting rail and clamping system that clamp to a truck bed with both vertical and horizontal clamping forces.

Still a further object of the present invention is to provide a rail with an angled extension. The extension provides a simple way of imparting both vertical and horizontal clamping forces.

Yet a further object of the present invention is the provision of a single clamp bracket that applies both a horizontal and vertical clamping force to the truck bed.

Another object of the present invention is the inclusion on the rail of a clamp bearing surface. This surface assists in the transmission of force from the clamping bracket to the mounting rail.

A further object of the present invention is to provide a mounting rail with a projection along the vertical portion thereof defining a cavity. The cavity permits the attachment of accessory items along the vertical portion of the mounting rail without spacing the entire vertical portion away from the the vertical portion of the truck bed.

Related objects and advantages of the present invention will be apparent from the following description.

DESCRIPTION OF THE PREFERRED EMBODIMENTS

Figure 1:
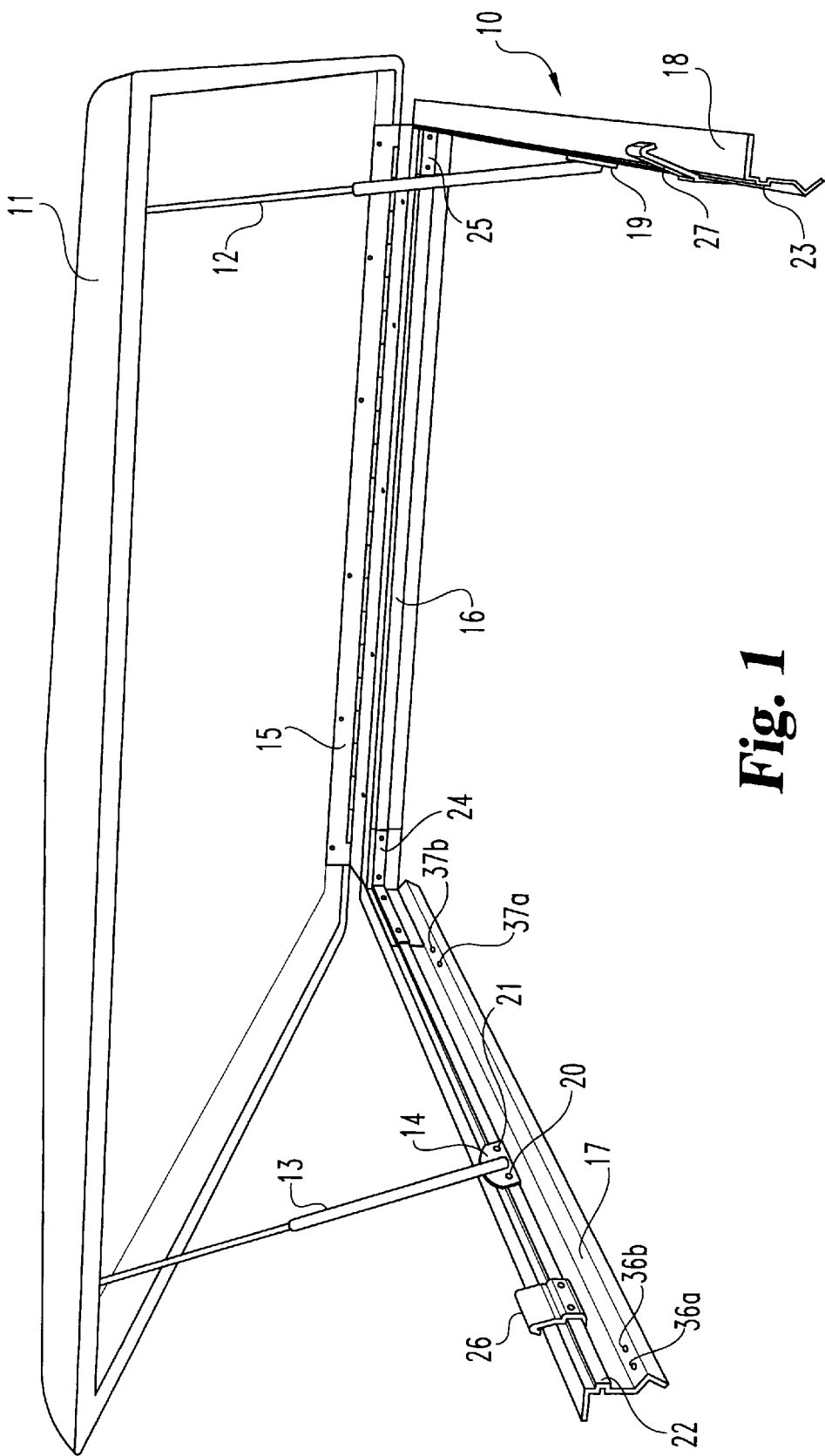
FIG. 1 is a perspective view of a preferred embodiment of the rail mounting system according to the present invention adapted for use with a truck bed tonneau cover.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 9:
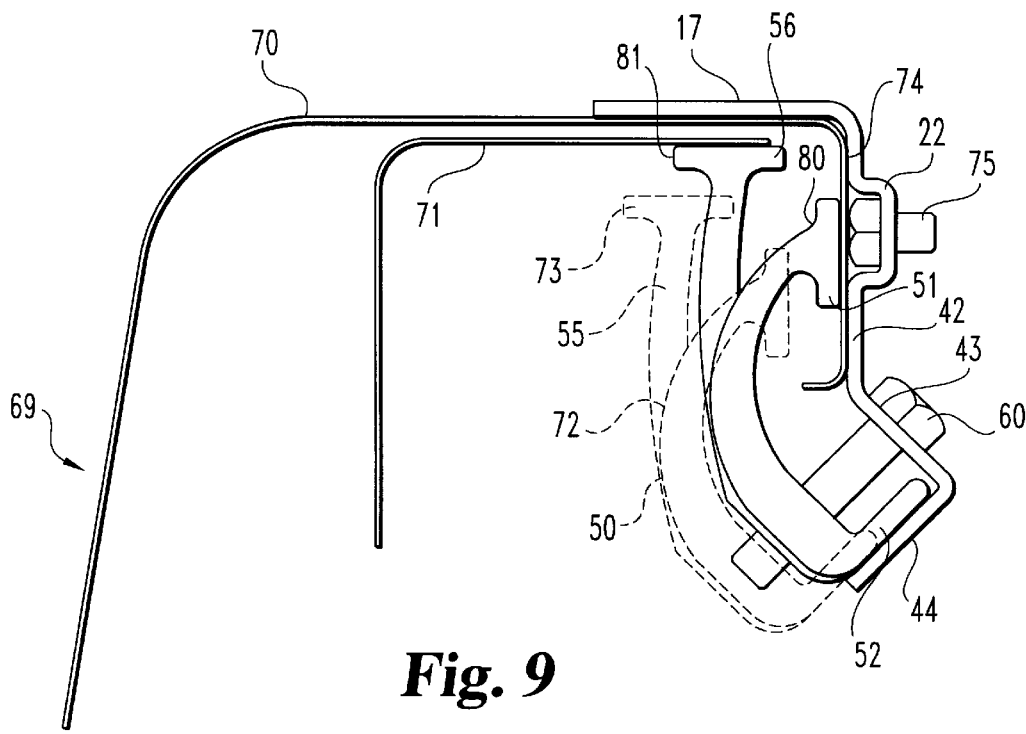
FIG. 9 is a side view of the clamps and rail of the rail mounting system of FIG. 1 attached to a truck bed sidewall.

Numerous accessories have been developed for attachment to or mounted on the truck bed sidewalls. The present invention relates to a unique and nonobvious apparatus adapted to securely mount any of a number of truck bed accessories to the truck bed. It will be understood that a truck bed consists of a conventional horizontal floor and surrounding side wall 69 having horizontal portions 70 and 71 and vertical portion 74 (FIG. 9). Although the preferred embodiment shown in FIG. 1 is adapted for use with a tonneau cover, it is contemplated that the mounting system may be used with any number of truck bed accessories including but not limited to truck caps, truck tool boxes, decorative truck side rails, vinyl truck covers, and bicycle carriers.

FIG. 1 illustrates a perspective view of a preferred embodiment according to the present invention adapted to mount a tonneau cover to a truck bed. In the preferred embodiment, the side rails of the mounting system are substantially coterminous with the truck bed side walls (not shown). As illustrated, rail mounting system 10 includes a left side rail 17, a right side rail 18, and a front rail 16. Rail mounting system clamps are attached by bolts extending through openings 36a, 36b, 37a, and 37b. Each of these rails is adapted to engage a horizontal portion and a vertical portion of the sidewall or front wall of a truck bed (not shown). The left side rail 17 is connected to front rail 16 by corner bracket 24. Right side rail 18 is connected to front rail 16 by a corner bracket 25. The attachment of front rail 16 to right side rail 18 is shown in greater detail in FIGS. 2 through 4 and it will be understood that the connection between left side rail 17 and front rail 16 is similar to the connection between right side rail 18 and front rail 16.

Figure 2:
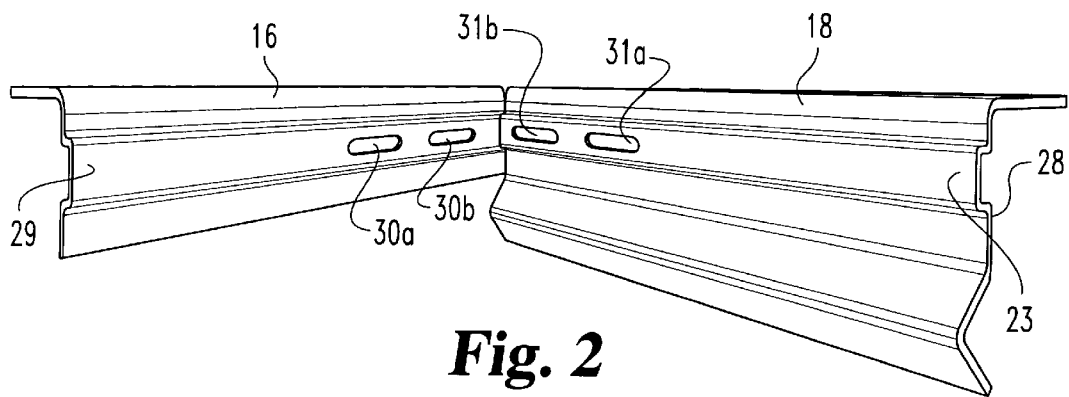
FIG. 2 is a perspective view of a portion of the front rail and the side rail of the rail mounting system of FIG. 1.

Referring now to FIG. 2, right side rail 18 has a raised projection 23 extending away from vertical wall 28 of rail 18. Raised projection 23 has oblong openings 31a and 31b formed adjacent its distal end. Similarly, front rail 16 has a raised front rail projection 29 with oblong openings 30a and 30b formed adjacent the right side of front rail 16.

Figure 3:
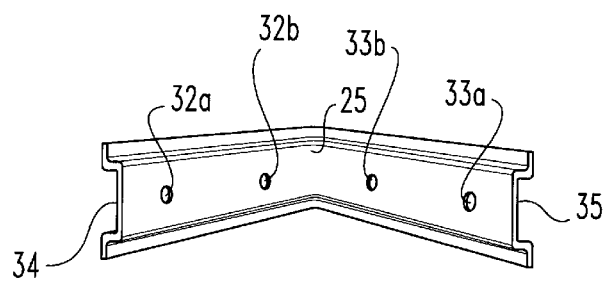
FIG. 3 is a perspective view of the corner bracket of the rail mounting system of FIG. 1.
Figure 4:
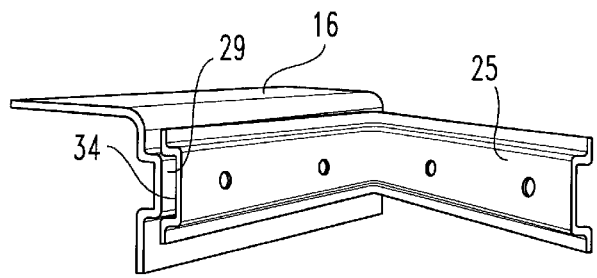
FIG. 4 is a perspective view of the corner bracket engaged with a portion of the front rail of the rail mounting system of FIG. 1.

Referring now to FIG. 3, corner bracket 25 is constructed with a corner bracket recess 34 sized to be mounted over front rail projection 29 and a corner bracket recess 35 sized to be mounted over right side rail projection 23. Corner bracket 25 includes openings 32a and 32b positioned to be aligned with front rail openings 30a and 30b. Corner bracket 25 further includes openings 33a and 33b positioned to align with right side rail openings 31a and 31b. Not shown are a series of bolts which extend through the various openings. Cavity 41 (FIG. 5) is sized to hold a bolt head such that the bolt head is prevented from rotating. In this preferred configuration, the bolt head is held in cavity 41 with the threaded shaft extending inwardly to receive the corner bracket and ultimately a threaded nut to hold the assembly together. One alternative is to securely fasten a nut in cavity 41 adjacent the openings. It will be understood that a threaded bolt may then be threaded into the nut to attach items to the rail. Another alternative includes riveting the corner bracket to the front and side rails.

In the preferred embodiment, front and side rail openings 30a and 30b, and 31a and 31b, are shown as oblong openings. It is preferred that these oblong openings are sized to permit the rails to be adapted to a variety of truck bed sizes. However, it is contemplated that openings 30a and 30b, and 31a and 31b, may be manufactured as substantially cylindrical openings and positioned for corresponding more precisely to a desired truck dimension. Alternatively, bracket 25 may have oblong openings to permit adjustment of the fastening members in bracket 25. Although the preferred embodiment of the present invention utilizes side rail and front rail projections to accomplish their connection, it is contemplated that other types of connections can be accomplished.

Referring now to FIG. 1, the rail mounting system 10 of the present invention has been adapted for use with tonneau cover 11 and includes a number of accessories. Tonneau cover 11 is attached to front rail 16 by piano hinge 15. In the present embodiment, piano hinge 15 is a separate item having a lower section attached to front rail 16 and an upper section attached to tonneau cover 11. However, it is contemplated that a portion of hinge 15 may be extruded with front rail 16 and a corresponding portion of hinge 15 may be extruded with tonneau cover 11. Upon assembly, tonneau cover 11 and front rail 16 have separate portions of hinge 15 interengaged to create the hinged engagement shown in FIG. 1.

As is known by those skilled in the art, tonneau cover 11 includes a pair of gas struts 12 and 13 to maintain tonneau cover 11 in an open position, thus permitting the user to gain access to the truck bed. Gas strut 13 is connected to left side rail 17 by gas strut mounting bracket 14, which is attached to side rail 17 by bolts 20 and 21. Gas strut 12 is connected to right side rail 18 by mounting bracket 19, similar in construction to mounting bracket 14. Further, side rails 17 and 18 each include a latch strike 26 and 27, respectively. It is understood that latch strikes 26 and 27 are cooperable with a latching mechanism (not shown) disposed in tonneau cover 11 to securely hold the tonneau cover in a closed position. Both gas strut mounting bracket 14 and latch strike 26 are attached to left side rail projection 22 such that the attachment may be comprised of the bolt and threaded nut assembly previously described for attachment of front rail 16 and side rail 18. This attachment provides a low profile connection, thus limiting the extent of the projections into the interior of the truck bed which may possibly snag cargo during unloading and loading of the truck bed. In addition, the low profile provides maximum cargo area within the truck bed.

FIGS. 5 through 9 illustrate left side rail 17 and its attachment to the sidewall of a truck bed. It will be understood that the description of the left side rail and its attachment to a truck bed sidewall is being disclosed herein and that the description is likewise applicable to the configuration and attachment of right side rail 18.

Figure 6:
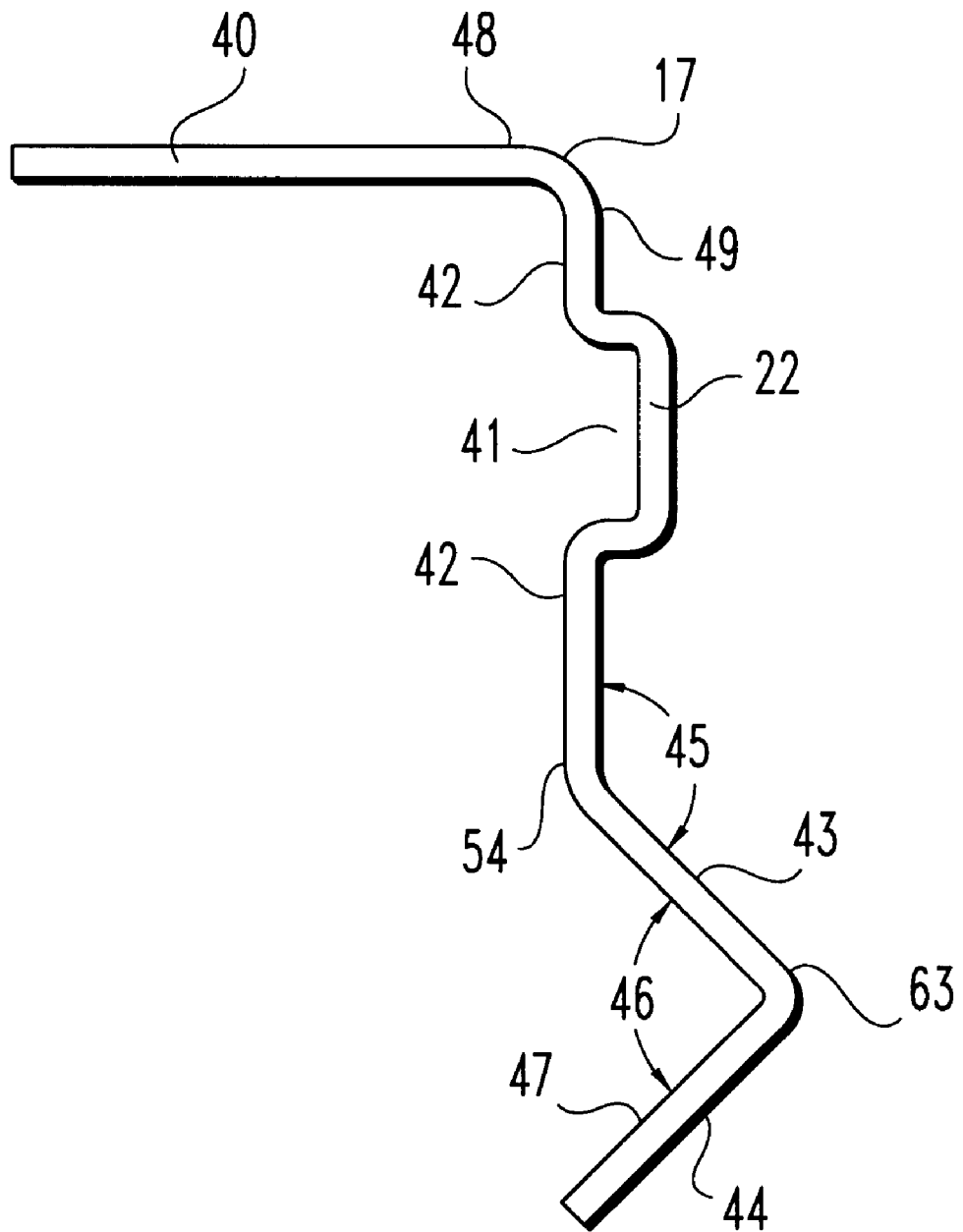
FIG. 6 is an end view of the rail of the rail mounting system of FIG. 1.
Figure 7:
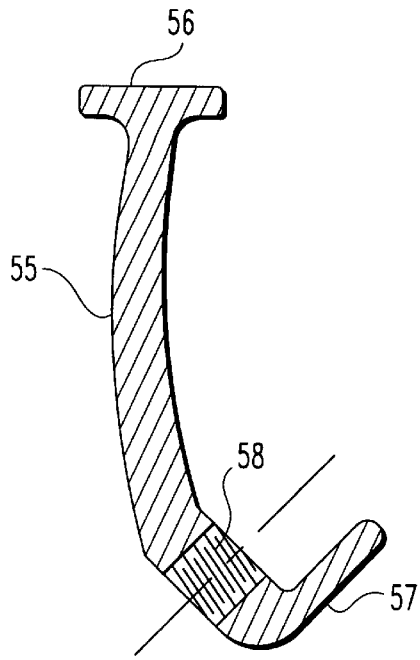
FIG. 7 is a cross-sectional side view of horizontal clamp 55 taken along line 7—7 of FIG. 5.
Figure 8:
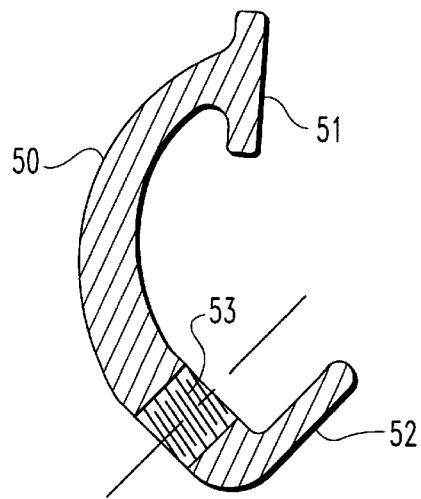
FIG. 8 is a cross-sectional side view of vertical clamp 50 taken along line 8—8 in FIG. 5.

Left side rail 17 is a substantially rigid member having a horizontal portion 40 (FIG. 6) adapted to engage horizontal surface 70 of truck sidewall 69 (FIG. 9). Edge portion 48 of horizontal portion 40 is connected to the upper edge 49 of vertical portion 42 (FIG. 6). Vertical portion 42 is adapted to engage vertical portion 74 of truck sidewall 69. It will be understood that commonly the mounting rail does not actually contact the surface of the truck sidewall. Rather, to prevent damage to the truck sidewall, cap tape or a similar nonabrasive material may be disposed between the horizontal surface 70 of truck sidewall 69 and horizontal portion 40 as well as between vertical portion 74 and mounting rail vertical portion 42.

The left side rail 17 further includes a side rail projection 22 defining a cavity 41 which extends the length of the rail. Cavity 41 is disposed in the vertical portion 42 of side rail 17 between upper edge portion 49 and lower edge portion 54 (FIG. 6). Projection 22 defines holes 62a and 62b (FIG. 5) for receiving an accessory mounting bolt 75 (FIG. 9) for attachment of other components to the mounting rail.

Left side rail 17 further includes a nonorthogonally angled extension 43 connected to the lower edge portion 54 of vertical a portion 42. Angled extension 43 further defines openings 36a, 36b, 37a, and 37b. In the present invention, angled extension 43 extends at a nonorthogonal obtuse angle 45 (FIG. 6) with respect to vertical wall 42 of rail 17. It is preferred that angled extension 43 extends at a nonorthogonal angle 45 with respect to vertical portion 42, such that threaded fastening members 60 and 61 passing through openings 36a and 36b respectively, can impart to a clamping member either a vertical clamping force or a horizontal clamping force. It is contemplated that the type of clamping force utilized depends on the configuration and orientation of the clamping surface of the clamping bracket. In the preferred embodiment of the present invention, angle 45 is approximately 135°. However, other nonorthogonal angles, whether obtuse or acute, are contemplated and are within the scope of the present invention, since they would also provide a clamping force, both in the vertical and horizontal directions.

Left side rail 17 further includes bearing extension 44 connected to the lower edge portion 63 of angle extension 43. In the preferred embodiment, bearing extension 44 is connected at a substantially orthogonal angle 46 (FIG. 6) to angled extension 43.

The rail of the present invention is formed by extrusion to create the disclosed features. However, it is contemplated that the entire rail or a portion thereof may be made by welding individual components or by stamping of metal sheets. A stamping operation may be desirable where the rail is relatively short, i.e., only a few inches long, to permit attachment to the sidewall at spaced intervals. Furthermore, although a steel material is utilized in the preferred embodiment of the rail, it is contemplated that the rail may be made of any number of materials providing the desired strength. Such materials may include, without limitation, other metals, fiberglass, plastics, or composite materials.

Figure 5:
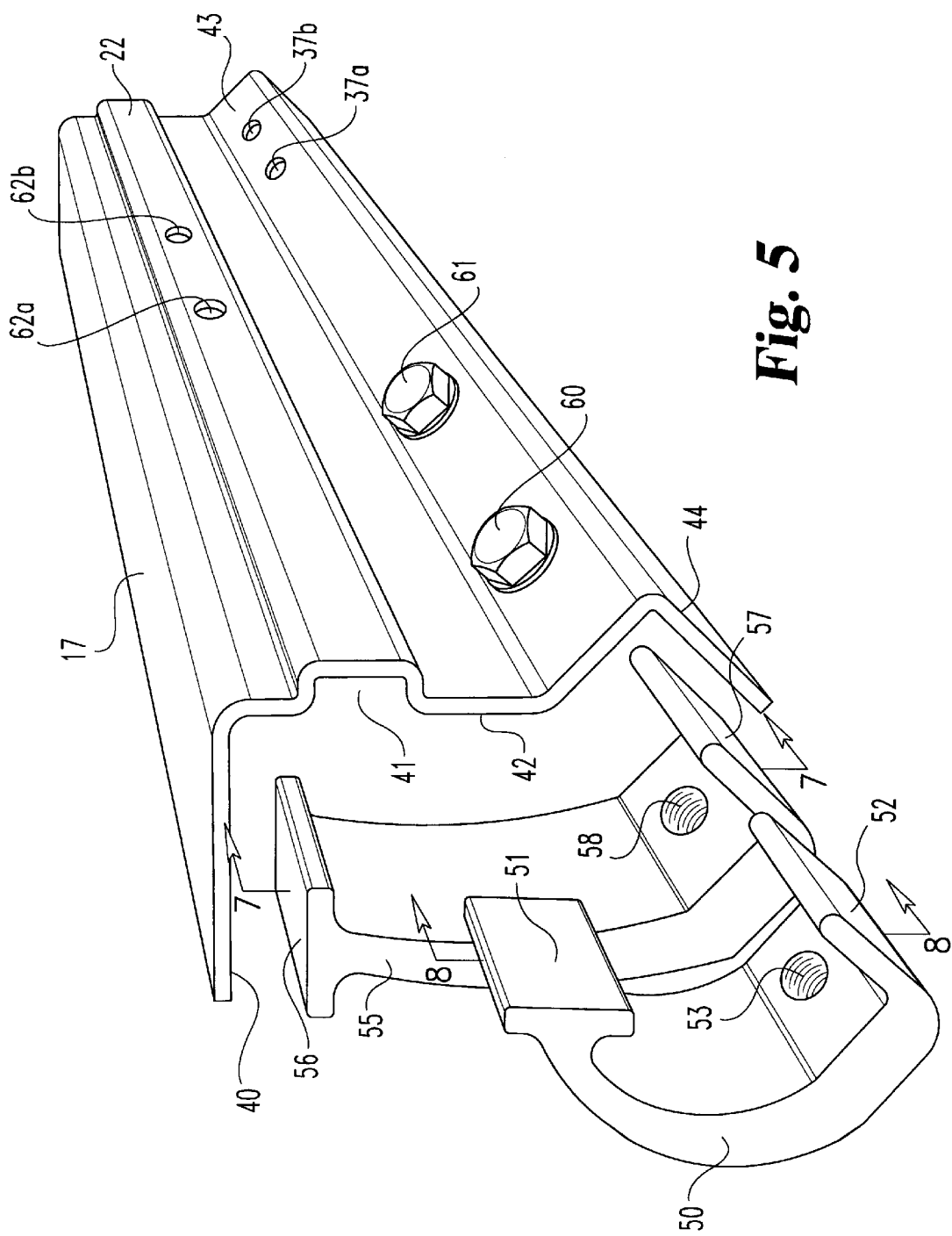
FIG. 5 is a perspective view of a side rail and clamp of the rail mounting system of FIG. 1.

Referring now to FIG. 5, vertical clamping bracket 50 and horizontal clamping bracket 55 have bearing surfaces 52 and 57, respectively, adapted to engage rail bearing surface 47. Disposed on the opposite end of the clamping bracket from the bearing surface is a clamping surface. In vertical clamping bracket 50, clamping surface 51 is configured with a substantially vertical surface oriented to clamp against vertical sidewall 74. Similarly, in horizontal clamping bracket 55, clamping surface 56 is configured with a substantially horizontal clamping surface 56 oriented to clamp against lower horizontal sidewall 71. Clamping brackets 50 and 55 each include a threaded opening disposed between the respective bearing and clamping surfaces. Clamping bracket 50 receives the threaded end of bolt 60 in threaded opening 53. Clamping bracket 55 receives the threaded end of bolt 61 in threaded opening 58. It being understood that as bolts 60 and 61 are rotated to draw clamping brackets 50 and 55 towards angled extension 43, bearing surfaces 52 and 57 bear against rail bearing surface 47 to transmit a portion of the clamping force to clamping surfaces 51 and 56, respectively.

Referring now to FIG. 9, the initial positions of clamping brackets 50 and 55 are shown in dashed lines at 72 and 73, respectively. Bolts 60 and 61 extend through side rail openings 36a and 36b (FIG. 1), respectively, with the threaded shaft of each bolt extending substantially parallel to bearing surface 47. Upon tightening of bolts 60 and 61, vertical clamping bracket 50 and horizontal clamping bracket 55 are moved into clamping positions 80 and 81, respectively. Vertical clamp bracket 50 clamps vertical truck bed sidewall 74 against vertical portion 42 of side rail 17. Similarly, horizontal clamping bracket 55 exerts an upward vertical force against lower horizontal portion 71 while transmitting a corresponding downward vertical force component to horizontal portion 40 of side rail 17, which in turn is exerted against the upper horizontal portion 70 of truck sidewall 69. The corresponding vertical forces securely clamp the rail to the horizontal portions of the truck bed. While the bolts of the preferred embodiment engage a corresponding threaded opening in the clamp brackets, it is contemplated that the brackets may be fastened to the rail by a variety of fasteners. By way of example only and without limitation, the fastening member may be a threaded bolt extending through an unthreaded opening in the clamping bracket; a nut may then be threaded onto the bolt to secure the clamping bracket. Alternatively, the clamping bracket may be urged into the desired clamping position by some additional apparatus, and the a nonadjustable fastener attached to the clamp bracket and rail.

The rail mounting and clamping system of the present invention provides a secure clamping force in both the horizontal and vertical directions. A 135° angle for the angle extension permits bolts 60 and 61 to transmit an equal amount of vertical and horizontal force to the attached clamping brackets. Moreover, it provides a low profile clamping means with the entire clamping member being hidden behind the side rail. This system reduces the amount of clamping bracket that extends into the cargo area of the truck bed and the angled extension and bearing surface connection provides a smooth surface that cargo may slide along without being snagged. Although the preferred embodiment is illustrated with a substantially rigid member (i.e. the side rail) extending substantially the entire length of a truck bed side wall, it is contemplated that only a small length of a substantially rigid member according to the present invention is required to accomplish the disclosed clamping function. The length of the rigid member depends on the items to be mounted and the aesthetic appearance desired.

Figure 10:
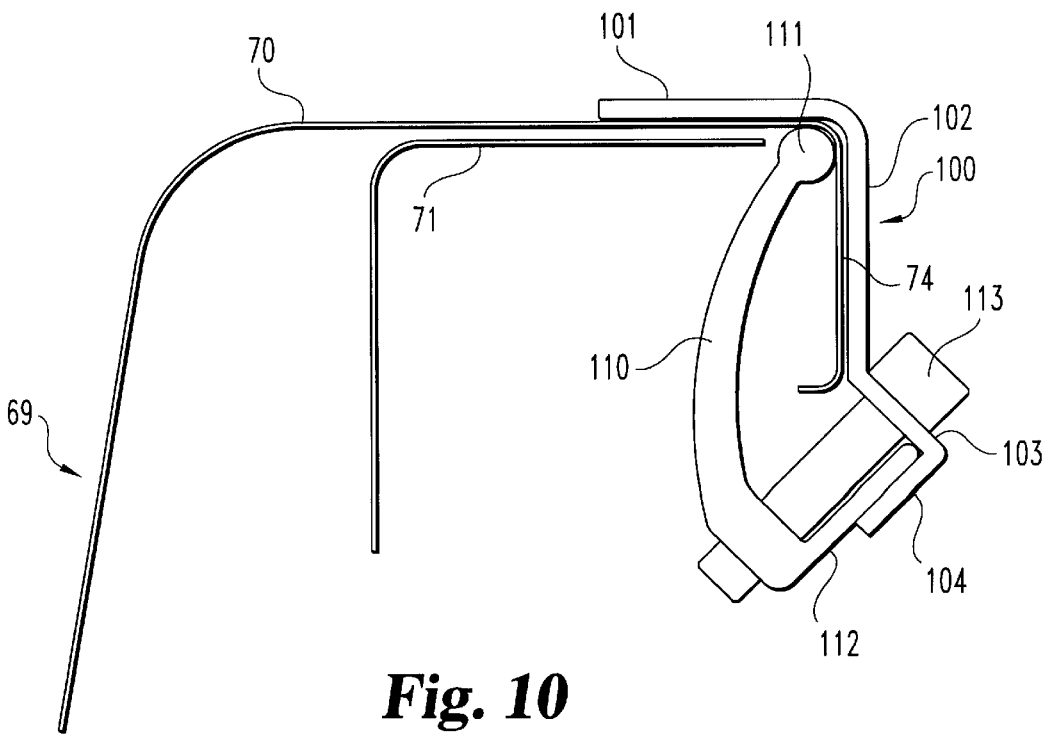
FIG. 10 is a side view of an alternative embodiment of a side rail and clamping member attached to a truck bed sidewall.

Referring now to FIG. 10, there is illustrated an alternative embodiment according to the present invention. Side mounting rail 100 is shown with a horizontal portion 101 and vertical portion 102. Side rail 100 further includes angled extension 103 extending from vertical portion 102 at a nonorthogonal angle. Preferably, side rail 100 includes bearing extension 104 connected to angled extension 103 at a substantially orthogonal angle. In this alternative embodiment, rather than have a separate vertical clamping bracket and a separate horizontal clamping bracket, clamping bracket 110 contacts both horizontal portion 70 and vertical portion 74 of truck bed sidewall 69. Clamping bracket 110 includes a bearing surface 112 which slides along rail bearing extension 104 as threaded member 113 is rotated to draw clamp bracket 110 towards angled extension 103. Clamping tip 111 is formed on the upper end of bracket 110 and is positioned to contact the junction of truck walls 70 and 74.

Upon forcing clamping bracket 110 against the truck sidewall, mounting rail 100 is securely clamped to truck sidewall 69 with both a vertical and horizontal clamping component transmitted via tip 111 to walls 70 and 74. While the clamping tip 111 of clamping bracket 110 is shown with a circular cross section, it is contemplated that clamping tip 111 may be formed with a bifurcated clamping surface having both a vertical clamping pad and a horizontal clamping pad.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A mounting system for a truck bed having a sidewall with a horizontal surface and a vertical surface, said mounting system comprising:

a substantially rigid member having a horizontal portion adapted to engage the horizontal surface of said truck bed sidewall and a vertical portion adapted to engage the vertical surface of said truck bed sidewall, said substantially rigid member further having an angled extension connected to said vertical portion and extending therefrom at a nonorthogonal angle; and a means for clamping said substantially rigid member to said truck bed sidewall, said means for clamping being attached to said angled extension, said means for clamping imparting both a vertical clamping force and a horizontal clamping force against said truck bed sidewall.

2. The mounting system of claim 1, wherein said angled extension defines a first opening and a second opening and said means for clamping includes a first clamping bracket adapted to impart said vertical clamping force on said truck bed sidewall and a first fastening member extending through said first opening to secure said first clamping bracket to said angled extension, said means for clamping further including a second clamping bracket adapted to impart said horizontal clamping force on said truck bed sidewall and a second fastening member extending through said second opening to secure said second clamping bracket to said angled extension.

3. The mounting system of claim 1, wherein said substantially rigid member further includes a bearing extension extending from said angled extension at a substantially orthogonal angle and said means for clamping includes a clamp bearing surface, said bearing surface bearing against said bearing extension.

4. The mounting system of claim 3, wherein said angled extension defines an opening and said means for clamping includes a threaded fastener having a proximal end defining a bolt head and a distal end, and a clamping bracket having a first end defining said clamp bearing surface and a second end opposite said first end defining a clamping surface for clamping against said truck bed sidewall, and said clamping bracket further defining a threaded opening disposed between said first end and said second end, said proximal end of said threaded fastener being threadedly received in said threaded opening.

5. The mounting system of claim 4, wherein said threaded fastener further includes a threaded shaft, and said shaft extends through said angled extension substantially parallel to said bearing extension.

6. The mounting system of claim 1, wherein said truck bed sidewall has an overall length and said substantially rigid member is substantially coterminous with said overall length.

7. The mounting system of claim 1, wherein said nonorthogonal angle is an obtuse angle.

8. The mounting system of claim 7, wherein said nonorthogonal angle is approximately 135°.

9. A truck bed sidewall mounting system comprising:
a substantially rigid member having a horizontal portion adapted to engage a horizontal surface of a truck bed sidewall and a vertical portion adapted to engage a vertical surface of said truck bed sidewall, said substantially rigid member further having an angled extension connected to said vertical portion and extending therefrom at a nonorthogonal angle, said angled extension defining an opening;
a fastening member extending through said opening in said angled extension; and
a clamping bracket attached to said fastening member, said fastening member securing said clamping bracket to said substantially rigid member, whereby said clamping bracket clamps against said truck bed sidewall.

10. The truck bed sidewall mounting system of claim 9, wherein said nonorthogonal angle is an obtuse angle.

11. The truck bed sidewall mounting system of claim 10, wherein said obtuse angle is approximately 135°.

12. The truck bed sidewall mounting system of claim 9, wherein said fastening member extends perpendicularly through said opening.

13. The truck bed sidewall mounting system of claim 9, wherein said clamping bracket has a proximal end adapted to engage both said vertical surface and said horizontal surface of said truck bed sidewall, and said fastening member is an adjustable fastening member, whereby upon tightening said adjustable fastening member said proximal end is urged towards said angled extension and said clamping bracket imparts both a vertical and a horizontal clamping force to said truck bed sidewall.

14. The truck bed sidewall mounting system of claim 9, wherein said clamping bracket is a horizontal clamping bracket adapted to engage said horizontal surface and said angled extension defines a second opening, and the mounting system further including a second fastening member extending through said second opening and a vertical clamping bracket adapted to engage said vertical surface, said vertical clamping bracket being attached to said second fastening member.

15. The truck bed sidewall mounting system of claim 9, wherein said substantially rigid member further includes a bearing extension attached to said angled extension and extending at a substantially orthogonal angle thereto.

16. The truck bed sidewall mounting system of claim 15, wherein said clamping bracket includes a distal end adapted to engage a portion of said truck bed sidewall and a proximal portion adapted to bear against said bearing extension.

17. A mounting rail for use in truck bed sidewall mounting systems, said mounting rail comprising:
a substantially horizontal portion adapted to engage a substantially horizontal surface of a truck bed sidewall;
a substantially vertical portion adapted to engage a substantially vertical surface of said truck bed sidewall, said substantially vertical portion having a first edge portion connected to said substantially horizontal portion and a second edge portion opposite said first edge portion; and
an angled extension connected to said second edge portion of said substantially vertical portion and extending therefrom at a nonorthogonal angle.

18. The mounting rail of claim 17, wherein said substantially vertical portion further includes a projection defining a cavity, said projection defining at least one opening therethrough and said cavity being adapted to receive an enlarged portion of a fastener extending through said opening.

19. The mounting rail of claim 17, wherein said angled extension includes a first extension edge portion attached to said second edge portion and a second extension edge portion opposite said first extension edge portion, and the mounting rail further including a bearing extension attached to said second extension edge portion.

20. The mounting rail of claim 19, wherein said bearing extension extends from said angled extension at a substantially orthogonal angle.

* * * * *